(12) United States Patent
Chiappetta et al.

(10) Patent No.: US 7,672,891 B2
(45) Date of Patent: *Mar. 2, 2010

(54) SOFTWARE APPLICATION PORTFOLIO MANAGEMENT FOR A CLIENT

(75) Inventors: Jeremy A. Chiappetta, Cambridge, MA (US); Jonathan M. Cohn, Springfield, NJ (US); Marcelo C. Magalhaes, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/131,950

(22) Filed: Jun. 3, 2008

(65) Prior Publication Data
US 2008/0235069 A1    Sep. 25, 2008

Related U.S. Application Data

(63) Continuation of application No. 10/431,724, filed on May 8, 2003.

(51) Int. Cl.
    *G06Q 40/00* (2006.01)
(52) U.S. Cl. .............................. 705/36; 705/38; 700/99
(58) Field of Classification Search .............. 705/35–45, 705/36–38, 99
See application file for complete search history.

(56) References Cited

U.S. PATENT DOCUMENTS 7,096,464 B1 * 8/2006 Weinmann .................. 717/169

2002/0095606 A1    7/2002    Carlton

OTHER PUBLICATIONS

Bacon, The Use of Decision Criteria in Selecting Information Systems/Technology Investments, MIS Quarterly, vol. 16, No.3, (Sep. 1992), pp. 335-353.*
Canfora et al., Software Maintenance, University of Sannio, Faculty of Engineering, Benevento, Italy, Nov. 29, 2000.*
Pisello, Return on Investment for Information Technology Providers: Using ROI as a Selling and Management Tool, Information Economics Press, 2001.*
Ahrens et al., Transition to a Legacy- and Reuse-based Software Life Cycle, Computer, vol. 28, Issue 10, Oct. 1995, pp. 27-36.*
Preserve or Redesign Legacy System?Schneidewind et al., IEEE Software, Jul./Aug. 1998.*
Framing the System Replacement Decision. E. Burton Swanson, The Anderson School at UCLA, Information Systems, Working Paper Jan. 1998, Feb. 26, 1998.*

(Continued)

*Primary Examiner*—Thomas Dixon
*Assistant Examiner*—Clifford Madamba
(74) *Attorney, Agent, or Firm*—John Pivnichny

(57) ABSTRACT

An information technology services providing company manages a portfolio of software applications for a client company. A plurality of the applications are preselected along with a recommendation for each. The recommendations have value drivers with parameters. Values for the parameters are received from the client as responses to questions or through collaboration with the client. A business value is then determined for the value drivers using the parameter values. Total cash flow, return on investment, net present value, internal rate of return, or other financial measures may be calculated. The client decides to proceed with the recommendations and the services providing company delivers services and software according to the recommendations.

5 Claims, 6 Drawing Sheets

OTHER PUBLICATIONS

C. James Bacon, The Use of Decision Criteria in Selecting Information Systems/Technology Investments, MIS Quarterly, vol. 16, No. 3, (Sep., 1992), pp.335-353.

Ahrens, J.D. et al., Transition to a Legacy- and Reuse-based Software Life Cycle, Computer, vol. 28, Issue 10, Oct. 1995, pp. 27-36.

Thomas Pisello, Return on Investment For Information Technology/ Providers: Using ROI as a Selling and Management Tool, Information Economics Press, 2001.

Morse and Zimmerman, Managerial Accounting, Irwin McGraw-Hill, Boston, 1997, p. 477.

WebSphere Software Platform, http://www.3.ibm.com/software/info1/websphere/index.jsp?tab=landings/roisplash&_TA, Apr. 16, 2003, 2 pages.

Michael Olsem, An Incremental Approach to Software Re-engineering, Software Maintenance: Research and Practice, pp. 181-202, 1998.

* cited by examiner

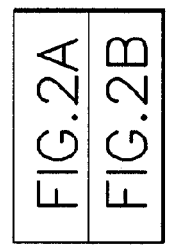

| SUMMARY | | | |
|---|---|---|---|
| EXPECTED SCENARIO | | RECOMMENDATION TYPE → | NET PRESENT VALUE (NPV) → 24 |
| | | TABLE 22 | |
| # | APPLICATION NAME (CLICK TO VIEW) 21 | RECOMMENDATION | NPV |
| 1 | INVENTORY MANAGEMENT SYSTEM | REPLACEMENT | $20,575,880 |
| 2 | CRM SYSTEM | RESTRUCTURE | ($1,566,814) |
| 3 | SPECIALIZED SALES SYSTEM | RETIRE | $9,571,397 |
| 4 | HR SYSTEM | REPRIORITIZE | $158,033 |
| 5 | ONLINE SALES CHANNEL | RELOCATE | ($1,017,411) |
| | ADDITIONAL APM APPLICATIONS | WILL VARY | |
| OVERALL APM EVALUATION (BASED ON SELECTED APPLICATION RECOMMEDATIONS) | | | |

FIG.2A

REDUCE TIME TO TEST AND FIX APPLICATIONS

| INPUT | CURRENT SITUATION | REDUCTION FACTOR |
|---|---|---|
| AVERAGE NUMBER OF HOURS TO TEST | 2,000 | 5.00% |
| AVERAGE NUMBER OF HOURS TO FIX, REPAIR, MAINTAIN EXISTING CODE | 12,000 | 5.00% |
| HOURLY COST OF PROGRAMMERS/PROFESSIONALS ALLOCATED TO TESTING/FIXING | $ 50.00 | |
| EXPECTED YEARLY BENEFIT FROM THE DRIVER | | |
| EXPECTED BENEFIT REALIZATION SCHEDULE | | |
| BENEFIT CASH FLOW | | |
| BENEFIT ESTIMATED VALUE RANGE | CONSERVATIVE SCENARIO | |
| | AGGRESSIVE SCENARIO | |

FIG.3A

| FIG.3A |
|---|
| FIG.3B |

FIG.3

| POST ENGAGEMENT | | | | | SOURCE | | | |
|---|---|---|---|---|---|---|---|---|
| 1,900 | | | | | | | | |
| 11,400 | | | | | | | | |
| $ | 50.00 | | | | CLIENT INFORMATION FROM STEP 1 | | | |
| | 35,000 | | P1 | P2 | P3 | P4 | P5 |
| | | 2 | 50.00% | 75.00% | 100.00% | 100.00% | 100.00% |
| | 90.00% | | 17,750 | 26,250 | 35,000 | 35,000 | 35,000 |
| | | | 15,750 | 23,625 | 31,500 | 31,500 | 31,500 |
| | 110.00% | | 19,250 | 28,875 | 38,500 | 38,500 | 38,500 |

FIG.3B

SOFTWARE APPLICATION PORTFOLIO MANAGEMENT FOR A CLIENT

This is a continuation of application Ser. No. 10/431,724 filed May 8, 2003.

TECHNICAL FIELD

The invention relates generally to a method of providing information technology services to a client. More particularly, the invention relates to a method of providing such services to a client with substantial savings over conventional methods.

RELATED APPLICATIONS

This invention is related to an application entitled "BUSINESS METHOD FOR INFORMATION TECHNOLOGY SERVICES FOR LEGACY APPLICATIONS OF A CLIENT", Ser. No. 10/431,723, filed May 8, 2003, and owned by common assignee—International Business Machines Corporation of Armonk, N.Y.

BACKGROUND OF THE INVENTION

During periods of slow economic expansion such as that encountered by today's technology companies, budget pressure is applied to limit and reduce spending by information technology (IT) organizations within the company. In addition, significant competitive and technological changes are forcing such IT organizations to keep up, just to stay even with their competitors. The IT organizations cannot simply wait until the economy improves to move on. Furthermore, the shift to an on-demand environment for IT services increases these pressures on companies.

In response, IT organizations need to get the most possible value out of the money they do spend on IT and also get the most possible value out of their existing IT assets.

Companies which provide IT services to other companies (clients) therefore need to help clients manage their large portfolios of applications in a way which extracts the most possible value from these portfolio assets, while also transforming applications to realize the business needs of the on-demand environment, flexibility, adaptability, and agility. Senior and IT executives at client companies are focused on the objectives of drive out cost and drive in value. However, because of the complexity involved in large application portfolios, these objectives are difficult to achieve. A client may have several thousand applications in their portfolio. Management of a client's application portfolio therefore is a significant problem both for IT services companies as well as for the client IT organizations.

In accordance with the teachings of the present invention, there is defined a new process for providing such application portfolio management to a client.

It is believed that such a process would constitute a significant advancement to the IT services providing art.

OBJECTS AND SUMMARY OF THE INVENTION

It is therefore a principal object of the present invention to enhance the IT services arts by providing a process for application portfolio management with enhanced capabilities.

It is another object to provide such a process wherein enhanced operational capabilities are possible.

It is yet another object to provide a computer program product configured to assist in managing an application portfolio for a client, with enhanced capabilities.

These and other objects are attained in accordance with one embodiment of the invention wherein there is provided a method of managing an application portfolio for a client, comprising the steps of, preselecting a plurality of applications for a client and a recommendation having value drivers, for each of the preselected applications, receiving from the client, parameters for the value drivers as responses to questions relating to the value drivers, determining business value of the value drivers from the parameters, determining total cash flow and financial metrics for the plurality of recommendations, for the client, and delivering the plurality of recommendations to the client.

In accordance with yet another embodiment of the present invention there is provided a computer program product configured to be operable to assist in managing an application portfolio for a client in accordance with the steps of, preselecting a plurality of applications for a client and a recommendation having value drivers, for each of the preselected applications, receiving from the client, parameters for the value drivers as responses to questions relating to the value drivers, determining business value of the value drivers from the parameters, determining total cash flow and financial metrics for the plurality of recommendations, for the client, and creating an executive summary of the total cash flow and the financial metrics for the plurality of recommendations for the client.

BRIEF DESCRIPTION OF THE DRAWINGS

FIG. 3 is a spreadsheet page for entering parameters for a value driver and calculating results of benefit cash flow.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
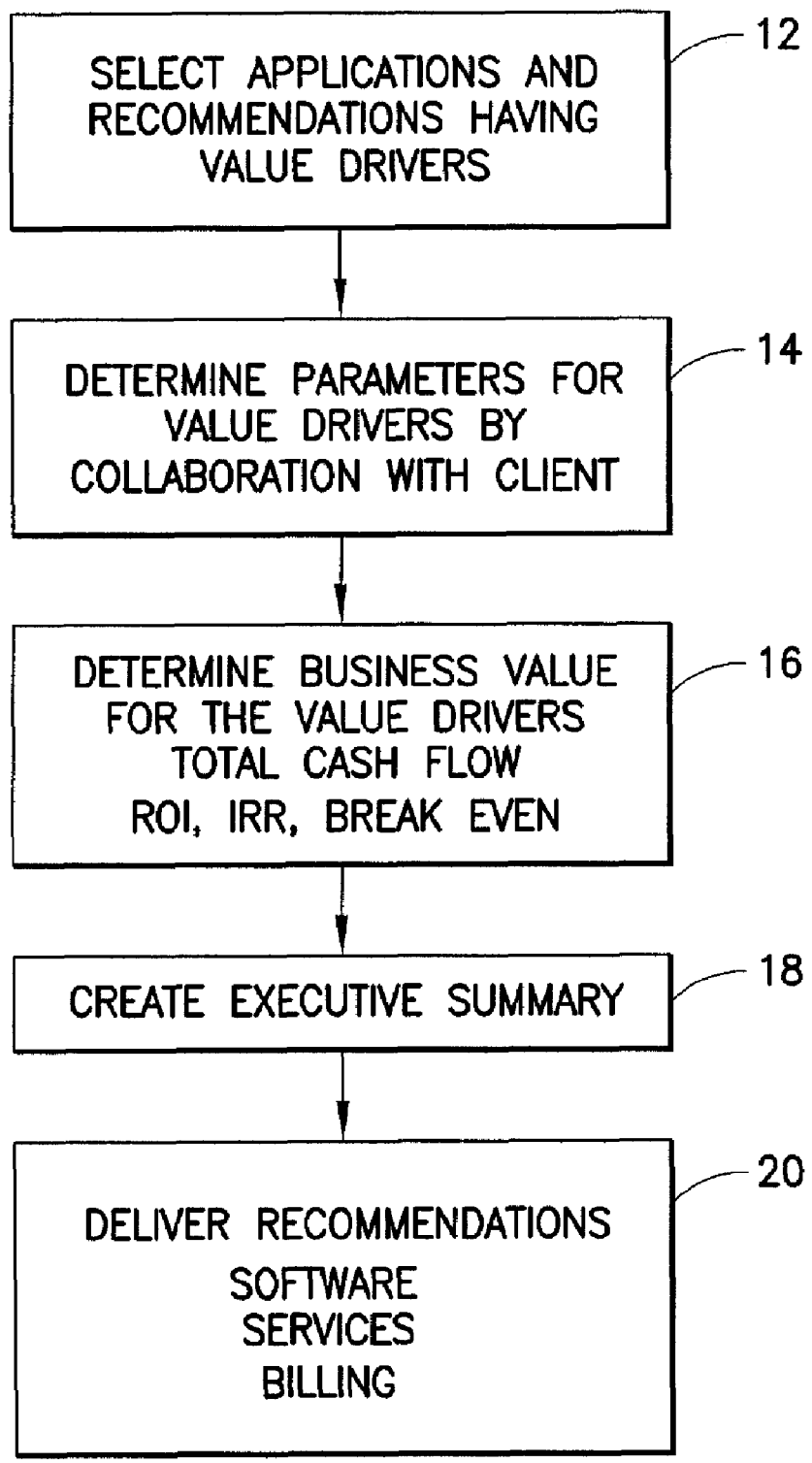
FIG. 1 is a flowchart depicting process steps in one embodiment of the present invention.

In FIG. 1 there is shown a flowchart of process steps for managing an application portfolio for a client company in accordance with one embodiment of the present invention. In step 12 a plurality of client portfolio applications are selected. The plurality may be any combination of client applications. In one embodiment, five applications representative of most applications in the portfolio are selected. A recommendation is also selected for each application in step 12. Recommendations comprise retire, replace, restructure, reprioritize, and relocate.

The retire recommendation is appropriate for low value, potentially high maintenance, applications which do not offer continued utility for the business and should be decommissioned. The limited capability (functionality and information) contained within the application will be migrated to other portions of the application portfolio.

The replace recommendation applies to applications which are important to the business operations, but should be providing more value and require more in terms of functional or informational quality or technology foundation. New applications will be identified, developed, or purchased to substitute for and/or supplement the capability of these applications.

The restructure recommendation is appropriate for applications which provide value, but whose functional or technical profile should be changed. For example, consolidate with other applications to reduce overlap or conflict with other systems; decrease the complexity of the application via implementation of modular or component architectures or new application to application integration approaches; improve the code structure, interface approach, middleware, or technical infrastructure to ease the maintenance burden.

A subset of the restructure recommendation may be to perform a transformation of legacy applications in accordance with teachings of related patent application "BUSINESS METHOD FOR INFORMATION TECHNOLOGY SERVICES FOR LEGACY APPLICATIONS OF A CLIENT" listed above. In that case the IT services providing company may not proceed past step 12, and instead perform the steps defined in this related application.

The reprioritize recommendation applies to modification or reclassification of the service level settings to save costs, such as from highly critical to important, based on changing business conditions. For example, changes could include a lower setting of criticality or fault severity levels, or a lower priority set for maintenance or enhancement request so workload effort against a particular application is reduced.

The relocate recommendation applies to use of alternate sourcing methods for application hosting, such as offshore, or application development, such as use of a contractor project basis.

Each of the recommendations makes use of one or more of the value drivers listed in Table 1.

TABLE 1

Value Drivers

| | |
|---|---|
| 1. | Reduction in overall IT maintenance budget |
| 2. | Decreased IT operations spending |
| 3. | Reduced operational costs to support new business requirements |
| 4. | Reduced time to test and fix applications |
| 5. | Decreased time to develop enhancements (faster to create new features) |
| 6. | Reduced development cost of supporting interoperability across multiple applications |
| 7. | Decreased platform/hardware and network costs |
| 8. | Decreased software costs (reduction of licenses) |
| 9. | Reduced demand for help desk support |
| 10. | Business savings due to reduced system downtime |
| 11. | Reduction in exception processing costs |
| 12. | Decreased cost to move and re-key data (reduced cost of supplying data to/from/within business) |
| 13. | Reduction in customer refunds |
| 14. | Decreased cost to build/maintain internet/intranet sites and distribute communication materials |
| 15. | Decreased operational costs due to reprioritization (deprioritization) |
| 16. | Impact on application training costs |
| 17. | Reduced travel expenses |
| 18. | Impact on information research and access (internal end-user productivity) |
| 19. | Improvement of sales |
| 20. | Reduction in core processing costs |
| 21. | Increased operational efficiency in other application areas |
| 22. | Improved data quality and data availability |
| 23. | Increased business flexibility (specific future options due to restructuring) |
| 24. | Real options benefits (a future opportunity that would not be an option without recommendation) |

In step 14, parameters are determined for the value drivers through collaboration with the client. In some cases the client may know the value for a parameter and provide it upon request. In other cases the value for a parameter is unknown to both the client and the IT services providing company. An assumed value can be established and documented through collaborative discussions.

In step 16 the business value for the value drivers is determined using the parameters determined in step 14. One measure of business value widely used in the business and accounting arts is an ROI (return on investment) calculation. For example, ROI is described as a ratio of income to investment in *Managerial Accounting* by Morse and Zimmerman, Irwin McGraw-Hill, Boston 1997, page 477. Calculations for other measures of a business value are also described by Morse and Zimmerman such as internal rate of return (IRR) and net present value (NPV). Other measures well known in the business and accounting arts include total cash flow, and break even analysis. Certain parameters are determined such as expenditures to be made at certain points in time and expected revenues (or savings) to be received at other points in time. The expenditures typically represent investments to be made by the client in implementing the recommendation, including purchases of the IT services company's offerings. The revenues typically represent savings or benefits received by the client due to implementing the recommendation. Additional parameters may also be used including alternative costs and time value of money. An ROI, NPV or other business value calculation is then made for the value drivers in step 16.

Spreadsheet tools or other business value software may be used to perform the calculations in step 16 as explained below in connection with FIGS. 2 and 3. A spreadsheet shall be understood herein to mean a software tool having a two dimensional array of cells in which a user may enter data or formulas in the cells to facilitate entry, calculating results, and recording values. Some spreadsheets permit data of nearly any type to be entered in a cell including a number, a mathematical formula, alphanumeric variable, test, a graphic, an audio or video clip, or an object of any type such as known in the object oriented programming arts. LOTUS 1-2-3® (LOTUS 1-2-3 is a trademark of Lotus Development Corporation, Cambridge, Mass.) and EXCEL® (EXCEL is a trademark of Microsoft Corp., Redmond, Wash.) are examples of spreadsheet software currently available which may be used for such calculations. A websphere ROI tool available from International Business Machines Corp., Armonk, N.Y. as described in the article "WebSphere software platform" dated Apr. 16, 2003 may also be used in step 16.

In step 18 an executive summary is created to summarize the business values of the many value drivers for each application recommendation of step 16. The executive summary may include such results in graphical form such as the graph of FIG. 4 described below. Based on the business values and executive summary, the client may decide to go forward with some or all of the recommendations selected in step 12.

In step 20 the IT services providing company implements the recommendations by delivering appropriate software and services to the client. In the on-demand environment, the delivered services and software may be billed to the client based on use.

Figure 2B:
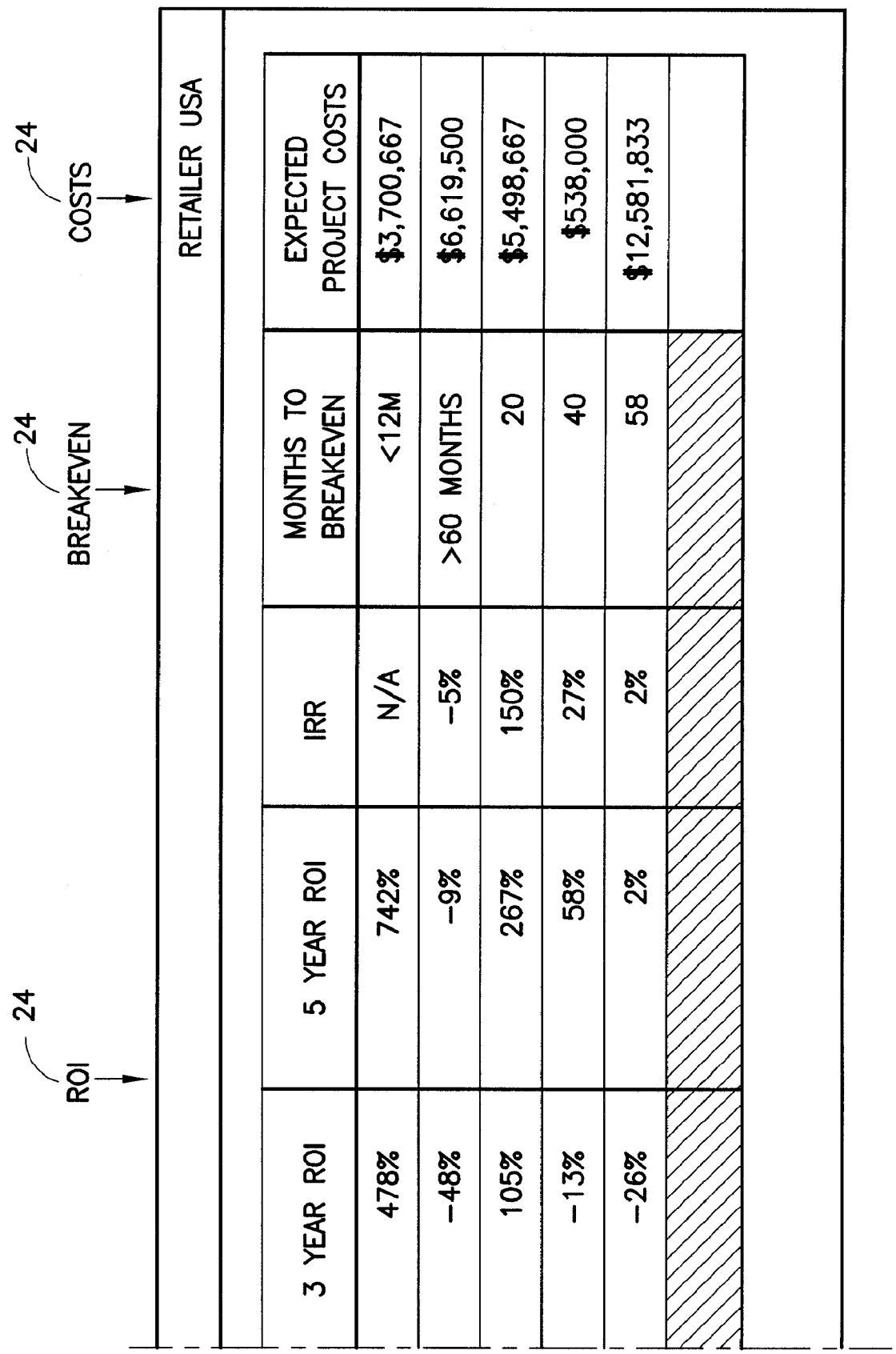
FIG. 2 is a spreadsheet page summarizing business value results for five typical applications from a client portfolio.

In FIG. 2 there is shown an example of a spreadsheet page listing five applications 21 selected for recommendations 22. The resulting value measures 24 of NPV, ROI, Breakeven, and Costs are summarized and displayed in adjacent columns of the spreadsheet example.

In FIG. 3 there is shown another example spreadsheet page for entry of parameter values for the value driver 31, reduce time to test and fix applications, found in line 4 and Table 1 above. The spreadsheet also shows results of calculations of business value 31, benefit cash flow in other cells of the spreadsheet for the period P1-P5. Conservative and aggressive scenarios are also calculated and displayed in other cells of the spreadsheet.

Figure 4:
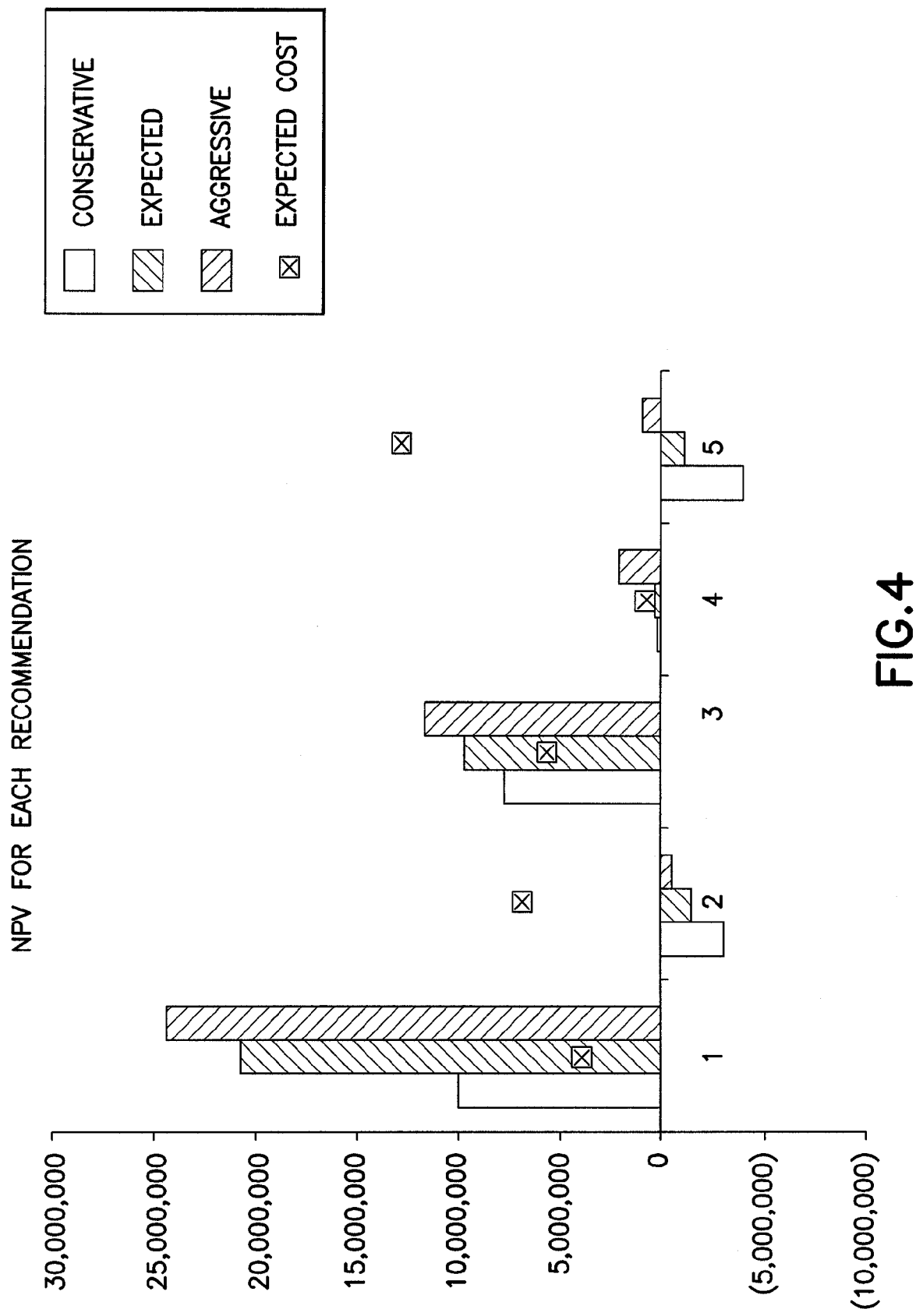
FIG. 4 is a bar graph depicting NPV and expected cost for five periods and three scenarios.

In FIG. 4 there is shown a bar graph on NPV and expected cost for conservative, expected, and aggressive scenarios for the P1-P5 periods, such as may be created for use in an executive summary.

While there have been shown and described what are at present considered the preferred embodiments of the invention, it will be obvious to those skilled in the art that various changes and modifications may be made therein without departing from the scope of the invention as defined by the appended claims.

What is claimed is:

1. A computer program product for managing an application portfolio for a client said computer program product comprising:

a computer readable medium storing program instructions executable by a computer processor;

first program instruction means for preselecting a plurality of applications for a client and a recommendation having value drivers, for each of the preselected applications, wherein said recommendation is reprioritize by modification or classification of service level settings to a lower setting of criticality, to save costs;

second program instruction means for receiving from said client, parameters for said value drivers as responses to questions relating to said value drivers;

third program instruction means for determining business value of said value drivers from said parameters;

fourth program instruction means for determining total cash flow and financial metrics for said recommendation, for said client; and fifth program instruction means for creating an executive summary of said total cash flow and said financial metrics for said recommendation for said client; and wherein all said program instructions means are recorded on said medium.

2. The computer program product of claim 1, wherein at least one of said recommendations includes an e-business on demand service delivery.

3. The computer program product of claim 1, wherein said business value includes a return on investment calculation.

4. The computer program product of claim 1, wherein said business value includes an internal rate of return calculation.

5. The computer program product of claim 1, wherein said financial metrics includes expected, aggressive, and conservative scenarios for said recommendation.

* * * * *